US008139576B2

(12) United States Patent
Sugai et al.

(10) Patent No.: US 8,139,576 B2
(45) Date of Patent: *Mar. 20, 2012

(54) NETWORK ROUTING APPARATUS

(75) Inventors: Kazuo Sugai, Ebina (JP); Nobuhito Matsuyama, Hadano (JP)

(73) Assignee: Hitachi, Ltd., Tokyo (JP)

( * ) Notice: Subject to any disclaimer, the term of this patent is extended or adjusted under 35 U.S.C. 154(b) by 30 days.

This patent is subject to a terminal disclaimer.

(21) Appl. No.: 12/202,779

(22) Filed: Sep. 2, 2008

(65) Prior Publication Data

US 2009/0010262 A1    Jan. 8, 2009

Related U.S. Application Data

(63) Continuation of application No. 11/454,937, filed on Jun. 19, 2006, now abandoned, which is a continuation of application No. 10/989,362, filed on Nov. 17, 2004, now Pat. No. 7,085,272, which is a continuation of application No. 09/767,707, filed on Jan. 24, 2001, now Pat. No. 7,088,716.

(30) Foreign Application Priority Data

Jan. 26, 2000   (JP) .................................. 2000-016582

(51) Int. Cl.
    H04L 12/56    (2006.01)
(52) U.S. Cl. ........................................................ 370/389
(58) Field of Classification Search .................. None
    See application file for complete search history.

(56) References Cited

U.S. PATENT DOCUMENTS

| 4,878,218 | A | 10/1989 | Takada |
| 5,383,181 | A | 1/1995 | Aramaki |
| 5,402,417 | A | 3/1995 | Aramaki |
| 5,434,863 | A | 7/1995 | Onishi et al. |
| 5,485,457 | A | 1/1996 | Aramaki |
| 5,859,718 | A | 1/1999 | Yamamoto et al. |
| 6,370,579 | B1 * | 4/2002 | Partridge ...................... 709/226 |
| 6,493,347 | B2 | 12/2002 | Sindhu et al. |
| 6,633,560 | B1 * | 10/2003 | Albert et al. .................. 370/351 |
| 6,744,762 | B1 | 6/2004 | Hojo |
| 6,775,279 | B2 | 8/2004 | Murai et al. |
| 2001/0036181 | A1 | 11/2001 | Rogers |
| 2005/0002334 | A1 * | 1/2005 | Chao et al. .................... 370/230 |
| 2005/0053080 | A1 * | 3/2005 | Wybenga et al. ............. 370/401 |

FOREIGN PATENT DOCUMENTS

| JP | 06-006370 | 1/1994 |
| JP | 1994-197111 | 7/1994 |

OTHER PUBLICATIONS

Ohta et al., "High Performance Routing Over Massively Parallel Routers", IPSJ (Information Processing Society of Japan) Study Report 98-HPC-71-7, May 15, 1998 (with English translation).

* cited by examiner

*Primary Examiner* — Kevin C Harper
*Assistant Examiner* — Rhonda Murphy
(74) *Attorney, Agent, or Firm* — Brundidge & Stanger, P.C.

(57) ABSTRACT

A network routing apparatus in which packet forwarding units for performing a packet forwarding process are arranged in parallel to one another, a packet distribution unit for distributing packets to the packet forwarding units arranged in parallel to one another, a packet rearrangement unit for rearranging outputs of the packet forwarding units are provided in the network routing apparatus, and packet retrieving units for retrieving packet headers in the packet forwarding units are further arranged in parallel to one another.

7 Claims, 16 Drawing Sheets

NETWORK ROUTING APPARATUS

This is a continuation application of U.S. Ser. No. 11/454,937, filed Jun. 19, 2006 now abandoned, which is a continuation application of U.S. Ser. No. 10/989,362, filed Nov. 17, 2004, now U.S. Pat. No. 7,085,272, which is a continuation application of U.S. Ser. No. 09/767,707, filed Jan. 24, 2001, now U.S. Pat. No. 7,088,716, the entire disclosures of which are hereby incorporated by reference and which claim priority to JP 2000-016582, filed Jan. 26, 2000.

BACKGROUND OF THE INVENTION

The present invention relates to a network routing apparatus. It particularly relates to a network routing apparatus which is adapted to a network routing apparatus such as a router, a repeater, or the like, in a computer network system and which can retrieve a forwarding address of an input packet at a high speed.

A network routing apparatus such as a router, a bridge, or the like, is generally used for connecting a plurality of networks to one another in a network system. The router examines a destination address of a packet received from a connected network to thereby determine the forwarding address of the packet and forwards the packet to a network to which a router or host of the forwarding address is connected.

Whenever the router receives a packet from a network interface board, the router determines a packet output interface on the basis of the destination information contained in header information of the packet, further determines a forwarding host or router out of hosts or routers connected to the packet output interface, and forwards the packet to the determined host or router. A higher-functional router performs, in addition to the function of forwarding the packet, a function (filtering function) for aborting a packet in accordance with the header conditions of the packets, a function (priority control function) for determining output priority of a plurality of packets to output the packets in the order of priority of the plurality of packets when such packets are to be forwarded, a function for rewriting Type of Service (ToS) contained in the header information of the packet, and so on.

Generally, the router further has a statistical function for counting the number of packets forwarded, the number of bytes forwarded, the number of packets aborted by filtering in the router or by traffic congestion of packets in the router, the number of (non-routed) packets undefined in terms of output destination as a result of retrieval (routing retrieval) of output addresses of packets, the number of packets addressed to the router itself, the number of packets satisfying the aborting condition of filtering, and so on. These pieces of statistical information are displayed on a terminal for managing router operations or router status indication, or the like, or these pieces of statistical information are sent to a network management apparatus in a network so as to be used for management of the network.

Functions other than the statistical function may be required as follows, in the case where the number of packet data transfer bytes needs to be measured. When, for example, a network provider receives packets from users, the packets are classified into several groups (hereinafter referred to as "flows") (for example, according to source/destination subnetwork, TCP/IP port number, address, etc.) on the basis of the header conditions of the packets. The data transfer rate of each flow is monitored whenever this classification is made. When the data transfer rate in this flow is too high, packets sent from the users in the flow over the bandwidth on the basis of contracts between the network provider and the users may be aborted or preferentially aborted at the time of traffic congestion. This function is called "bandwidth policing function". Further, when network users transmit packets to a network of a network provider, the output rate of packet data belonging to the flow of the network provider may be limited, by a router, within the bandwidth on the basis of a contract between the router and the network provider. This function is called "shaping function". To achieve the bandwidth policing function or the shaping function, the number of data transfer bytes (data transfer rate) of packets flowing in the router needs to be measured at intervals of a predetermined time.

Processing in a router is classified into the aforementioned process which needs to be performed whenever a packet enters the router, a process in which routing information in a network system is transferred between routers so that a routing table is generated in the router, and a process which need not be performed whenever a packet such as statistical information of the router transferred between the router and a network management apparatus enters the router.

The aforementioned processing in a router is heretofore carried out by executing software processing. To improve performance of processing required whenever a packet enters a router, a plurality of units (RPs: Routing Processors) for performing this processing are provided in the router. Network interface boards are connected to the RPs correspondingly and respectively. The RPs are connected to one another through a bus or through a cross bar switch so that packets are forwarded between network interface boards connecting individual RPs, respectively. In this manner, high-speed processing in the router is attained. An example of the aforementioned router is an apparatus that is disclosed in U.S. Pat. No. 5,434,863 (JP-A-5-199230).

Traffic flowing in a network has, however, increased so that the routing process needs to be performed at a higher speed. As a result, software processing used for achieving the routing process has been replaced by hardware processing.

SUMMARY OF THE INVENTION

Traffic flowing in a network has been increasing at a pace higher than improvement of processing capacity achieved with the advance of hardware element techniques such as LSI manufacturing techniques in recent years. If the router or bridge processes the traffic, through hardware, whenever the router or bridge receives a packet from a network interface board, the router or bridge cannot cope with the increase in network traffic.

Upon such circumstances, an object of the present invention is to provide a routing apparatus in which hardware units for performing a routing process are arranged in parallel to one another to thereby improve the total performance of the router more greatly than the processing capacity achieved with the advance of hardware element techniques such as LSI manufacturing techniques so that the routing apparatus can sufficiently cope with the increase in network traffic occurring in recent years.

According to the present invention, the router has network interface boards (NIFs) for performing a packet I/O interface operation, routing processors (RPs) for retrieving forwarding addresses of packets on the basis of header information of the packets and for forwarding the packet to the forwarding addresses, a routing manager (RM) for performing control of the respective RPs and transmission/reception of control packets such as routing protocols, and a cross bar switch (CSW) for connecting the respective RPs to the RM and for performing forwarding of packets between RPs and between RM and RPs. A plurality of packet forwarding units for retrieving destination addresses of packets on the basis of header information of the packets and for forwarding the packets to the destination addresses are provided in each of the RPs. Packets sent from the NIFs and packets sent from the CSW are distributed one by one to the packet forwarding units.

To limit the process to be performed by the packet forwarding units to thereby simplify the configuration of the packet forwarding units, the packet forwarding units may be configured so that packet forwarding units for forwarding packets from the NIF to the CSW are provided separately from packet forwarding units for forwarding packets from the CSW to the NIF. To shorten the idle time of the packet forwarding units to thereby improve the processing performance, per packet forwarding unit, of the router, the packet forwarding units may be configured so that each of the packet forwarding unit serves as a unit for forwarding packets from NIF to CSW and for forwarding packets from CSW to NIF.

Further, according to the present invention, each of the RPs has forward packet distribution units so that packets sent from the NIF or from the CSW are distributed to the plurality of packet forwarding units in the RP. The forward packet distribution units distribute packets by a round-robin method, by an out-of-order method, or by a hash method. The round-robin method is a method in which packets are distributed sequentially to the packet forwarding units in entering order of the packets. The out-of-order method is a method in which packets are distributed to empty ones of the packet forwarding units. The hash method is a method in which packet forwarding units used for distributing packets are univocally determined on the basis of the header conditions of the packets.

A function (hash function) used in the hash method for determining forwarding addresses of packets can be set in such a condition that a series of packets to be continuously sent from a packet sender address to a forwarding address are all assigned to one packet forwarding unit. A pseudo-random number sequence generated on the basis of the header conditions may be used as the hash function so that packets can be assigned to the packet forwarding units as uniformly as possible.

Further, according to the present invention, each of the RPs has forward packet rearrangement units for rearranging the packets subjected to the forwarding process by the plurality of packet forwarding units in the RP and for sending out the rearranged packets to the NIF or to the CSW.

When a round-robin method or an out-of-order method is used as a distributing method in the forward packet distribution units, the forward packet rearrangement units rearrange packets in the order of the packets entering the router after each of the packet forwarding units performs a packet forwarding process because the order of completion of the packet forwarding process in the packet forwarding units in the RP may be reversed to the entering order of the series of packets to be continuously sent from the packet sender address to the destination address. When an out-of-order method is used as a distributing method in the forward packet distribution units, packets are numbered sequentially when the forward packet distribution units assign the packets to the packet forwarding units so that the forward packet rearrangement units can rearrange the packets in the order of the packets entering the router. In this case, the packets are taken around with the sequence numbers in the packet forwarding units, so that the forward packet rearrangement units rearrange the packets in the order of the sequence numbers assigned to the packets, and send out the rearranged packets.

Further, according to the present invention, each of the packet forwarding units has a forward packet processing queue waiting for the start of the packet forwarding process after reception of packets from the forward packet distribution units, and a forward packet rearrangement queue waiting for sending of the packets to the forward packet rearrangement units after the completion of the packet forwarding process in the packet forwarding units.

A plurality of packet retrieving units for retrieving packet header information are provided in each packet forwarding unit so that packet header retrieving processes among the processes performed by the packet forwarding unit are arranged in parallel to one another to attain high-speed processing, A packet header operating mechanism for extracting the headers of packets is provided in the packet forwarding unit so that header information of the packets can be extracted. A retrieval packet distribution unit for distributing the extracted packet headers to the respective packet retrieving units is provided in the packet forwarding unit. Each of the packet retrieving units retrieves forwarding addresses of packets on the basis of the header information of the packets, retrieves the packets to be aborted or to be forwarded (filtering retrieval), and retrieves output priority of packets (communication quality retrieval). Each of the packet retrieving units returns information concerning the forwarding addresses of the packets, information as to whether the packets are to be aborted or not and information concerning the output priority of packets. A retrieval packet rearrangement unit for rearranging retrieval results in the packet retrieving units and for transferring the rearranged retrieval results to the packet header operating mechanism is further provided in the packet forwarding unit.

To attain higher-speed processing, parallel arrangement of the packet forwarding units and parallel arrangement of the packet retrieving units may be performed simultaneously.

Further, according to the present invention, statistical information picked up in the plurality of packet forwarding units or in the plurality of packet retrieving units is tabulated as follows. A software program managing the router as a whole reads statistical information in the respective packet forwarding units or in the respective packet retrieving units and tabulates the information by software processing so that the tabulated information is displayed as total statistical information of the router on a management terminal or so that the tabulated information is sent to the network management apparatus. Alternatively, a processor is provided in each of the RPs. A software program operating on the processor reads statistical information in the respective packet forwarding units or in the respective packet retrieving units and tabulates the statistic information by software processing.

Further, according to the present invention, packets are classified into several groups (hereinafter referred to as "flows") in accordance with the header conditions of the packets. Data transfer rate of each flow is measured whenever this classification is made. The flows are numbered so that the packets can be aborted in accordance with the data transfer rate or aborted easily at the time of traffic congestion or so that the packet sending rate can be limited at the time of sending of the packets. The flow numbers are outputted from the respective packet forwarding units or from the respective packet retrieving units. The data transfer rate in every flow is measured in the forward packet rearrangement units or in the retrieval packet rearrangement unit in accordance with the flow numbers.

DESCRIPTION OF THE EMBODIMENTS

Figure 1:
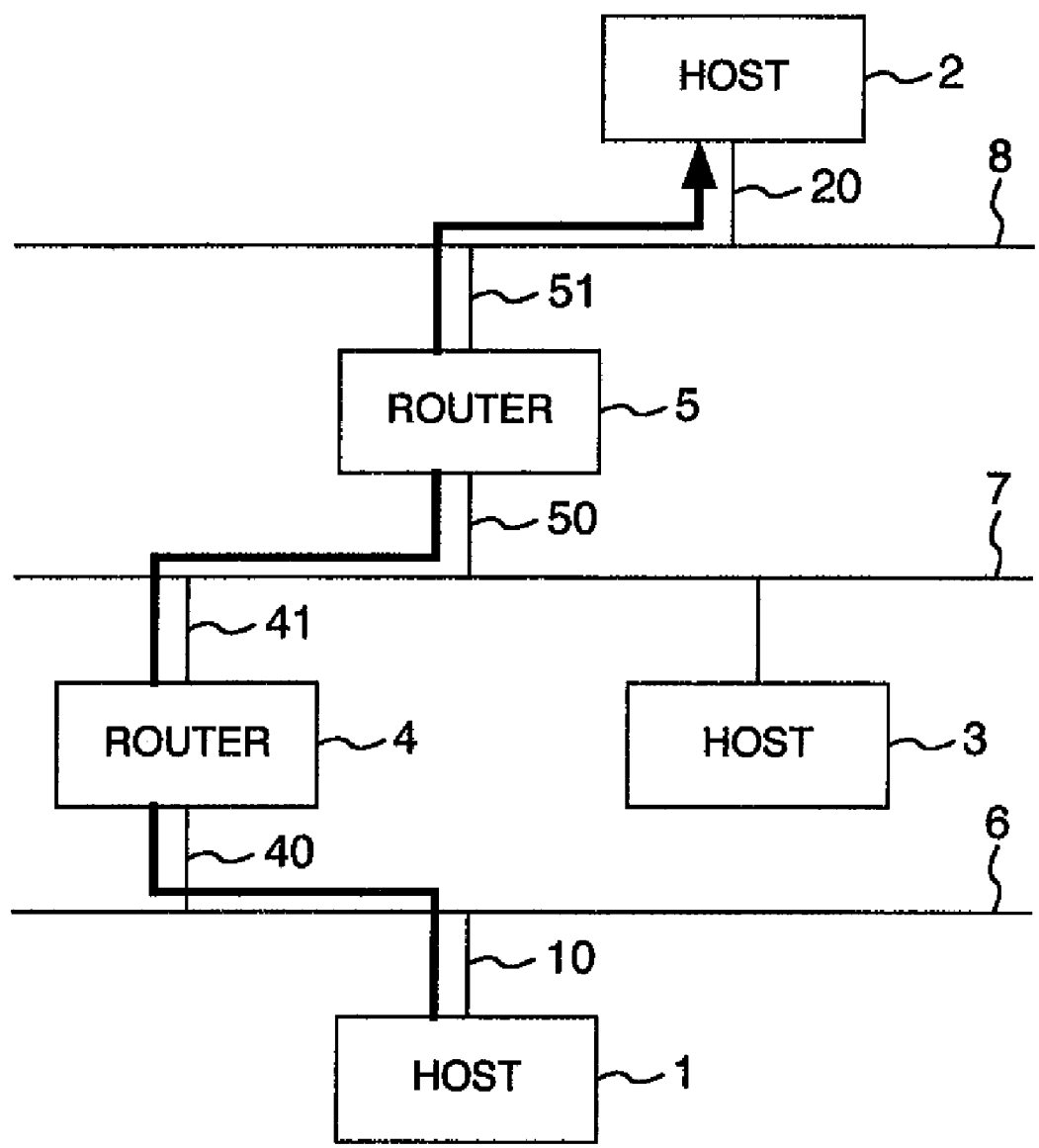
FIG. 1 is a diagram showing the overall configuration of a network system using routers according to an embodiment of the present invention.

FIG. 1 is a diagram showing the overall concept of a network system using routing apparatuses according to the present invention. In FIG. 1, the network system comprises: hosts 1, 2 and 3 which may be packet senders/receivers; routers 4 and 5 for forwarding packets in accordance with destination addresses written in headers of the respective packets; and sub-networks 6, 7 and 8 to which the hosts and the routers are directly connected and in which data are transferred between the hosts and the routers. The routers 4 and 5 may be also packet senders/receivers.

When, for example, a packet is to be forwarded from the host 1 to the host 2, the host 1 forwards the packet from an interface 10 to the router 4 connected to the interface 10 through the sub-network 6. The router 4 receives the packet from an interface 40 connected to the sub-network 6 and forwards the packet from an interface 41 to the router 5 connected to the interface 41 through the sub-network 7. Similarly, the router 5 receives the packet from an interface 50 and forwards the packet from an interface 51 to the host 2 connected to the interface 51 through the sub-network 8. The host 2 receives the packet from an interface 20. Addresses in sub-networks are used for specifying routers or hosts peculiar to the sub-networks.

Figure 2:
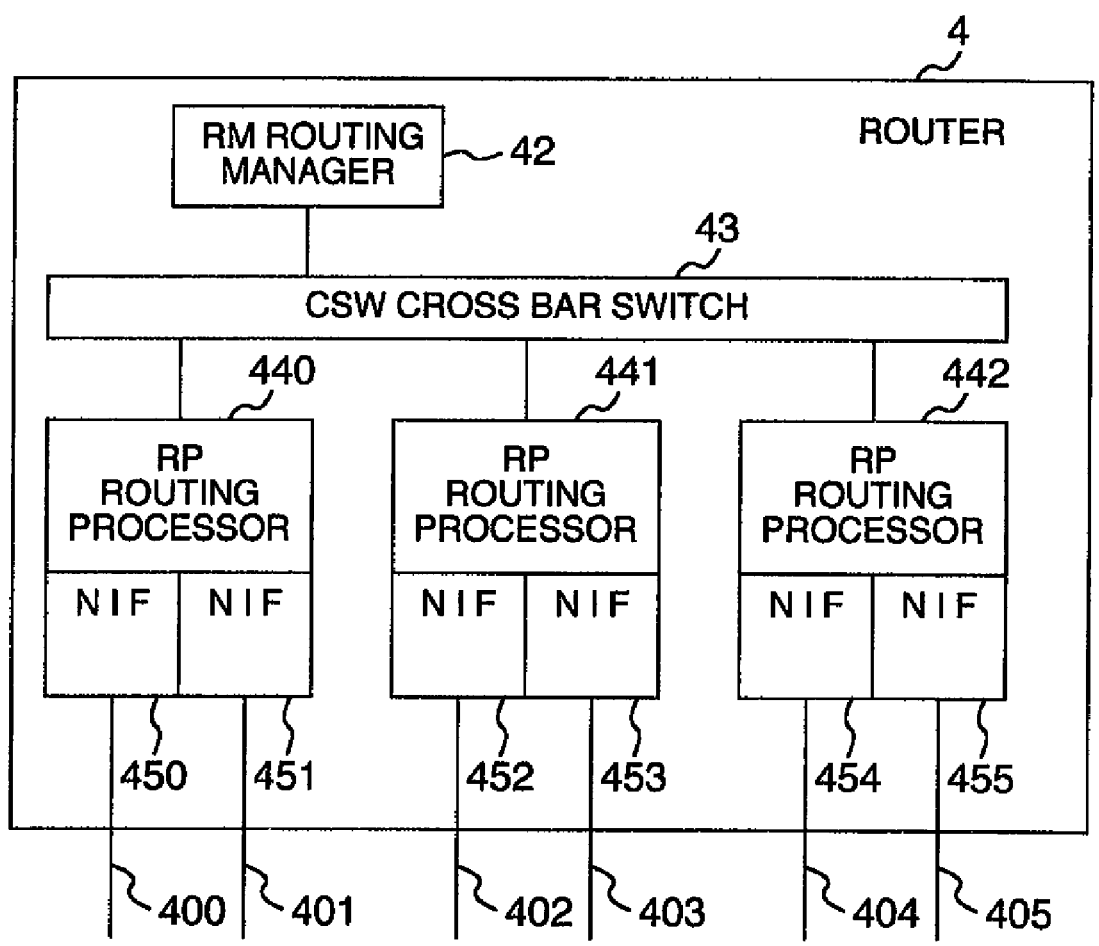
FIG. 2 is a block diagram showing the overall internal configuration of a router according to an embodiment of the present invention.

FIG. 2 is a block diagram showing the overall internal configuration of a router. In FIG. 2, the router 4 includes: network interface boards (NIFS) 450 to 455 for performing packet I/O interface operations; routing processors (RPs) 440 to 442 for retrieving a forwarding address of a packet on the basis of header information of the packet and forwarding the packet to the forwarding address; a routing manager (RM) 42 for performing general management of the router, control of the respective RPs, management of routing information, etc. on the basis of transmission/reception of a control packet such as a routing protocol; and a cross bar switch (CSW) 43 for connecting the respective RPs and the RM to perform packet transfer between the RPs and between the RM and the RPs. The NIFs 450 to 455 are connected to network interfaces 400 to 405 respectively. The network interfaces 400 to 405 in FIG. 2 correspond to the network interfaces 40 and 41 in FIG. 1. Such network interfaces are classified into LAN (Local Area Network) such as Ethernet, or the like; WAN (Wide Area Network); ATM (Asynchronous Transfer Mode); etc. The NIFs 450 to 455 are constituted by different hardware in accordance with the interface classification.

Figure 3:
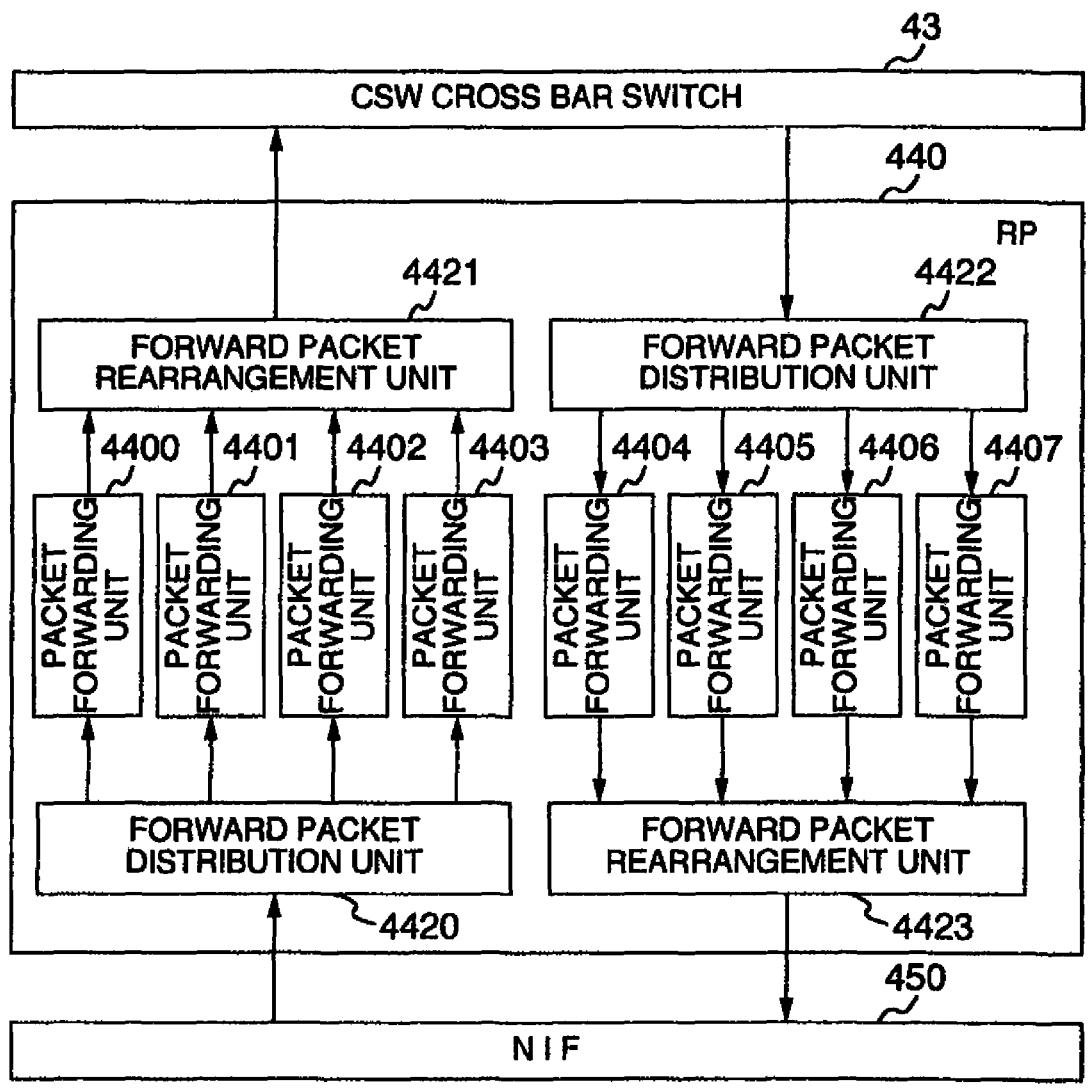
FIG. 3 is a block diagram showing the internal configuration of a routing processor having parallel packet forwarding units according to an embodiment of the present invention (in the case where the packet forwarding units are independent of one another on the basis of directions of transmission thereof)
Figure 4:
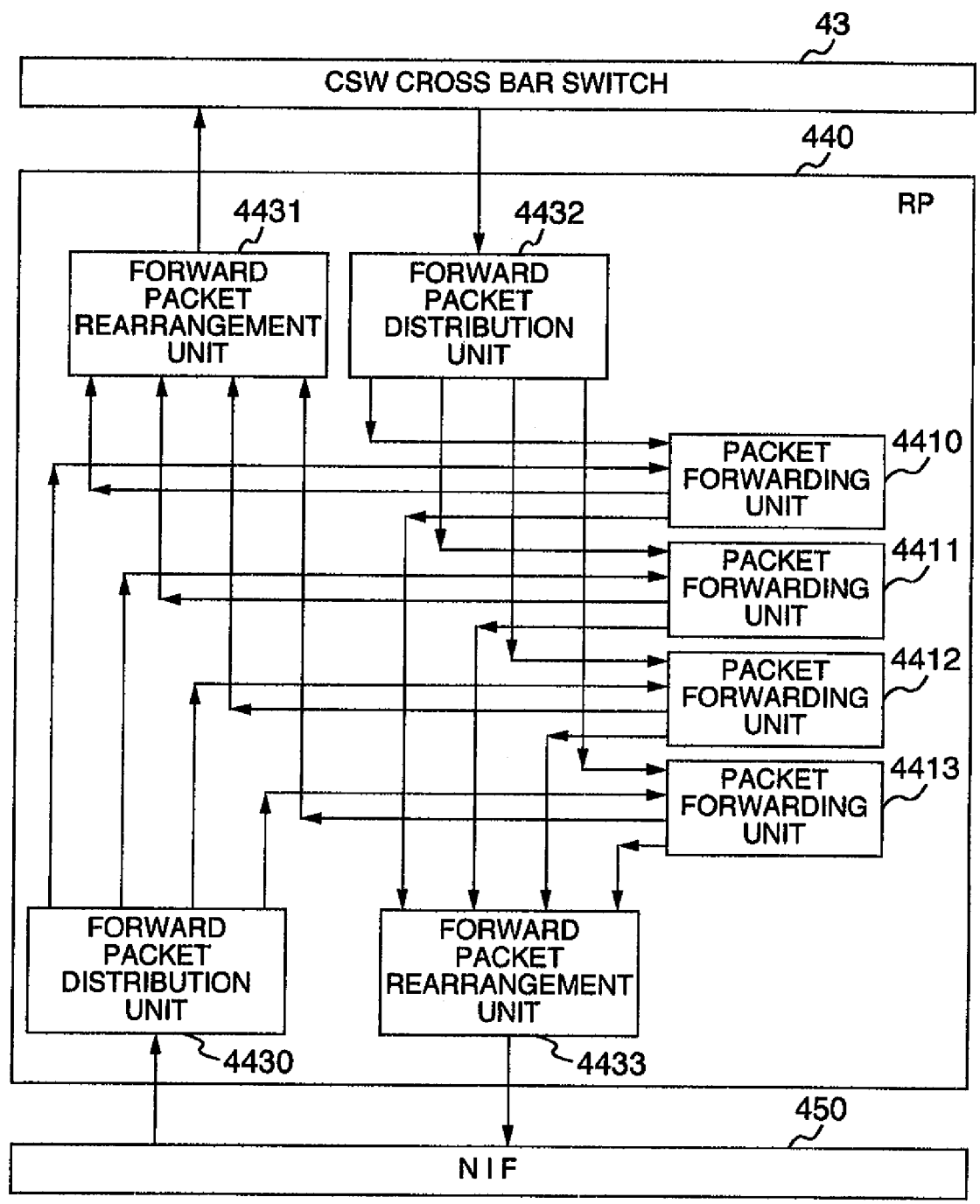
FIG. 4 is a block diagram showing the internal configuration of a routing processor having parallel packet forwarding units according to anther embodiment of the present invention (in the case where one packet forwarding unit performs a bilateral packet forwarding process)

FIGS. 3 and 4 are block diagrams showing the internal configuration of the RP 440. FIGS. 3 and 4 show two examples of the internal configuration of the routing processor according to the present invention in the case where packet forwarding units are arranged in parallel to one another. The packet forwarding units 4400 to 4407 (FIG. 3) and 4410 to 4413 (FIG. 4) perform a process for retrieving a destination address of a packet on the basis of header information of the packet in the RP 440 and for forwarding the packet to the destination address. To distribute load, a plurality of packet forwarding units are provided in the RP 440 so that packets sent from the NIF and CSW are assigned one by one to the plurality of packet forwarding units. FIG. 3 shows an example of configuration of the RP 440 in the case where packet forwarding units 4400 to 4403 for forwarding packets sent from the NIF are provided separately from packet forwarding units 4404 to 4407 for forwarding packets sent from the CSW. FIG. 4 shows an example of configuration of the RP 440 in the case where the packet forwarding units 4410 to 4413 serve as units for forwarding packets sent from the NIF and for forwarding packets sent from the CSW.

Figure 11:
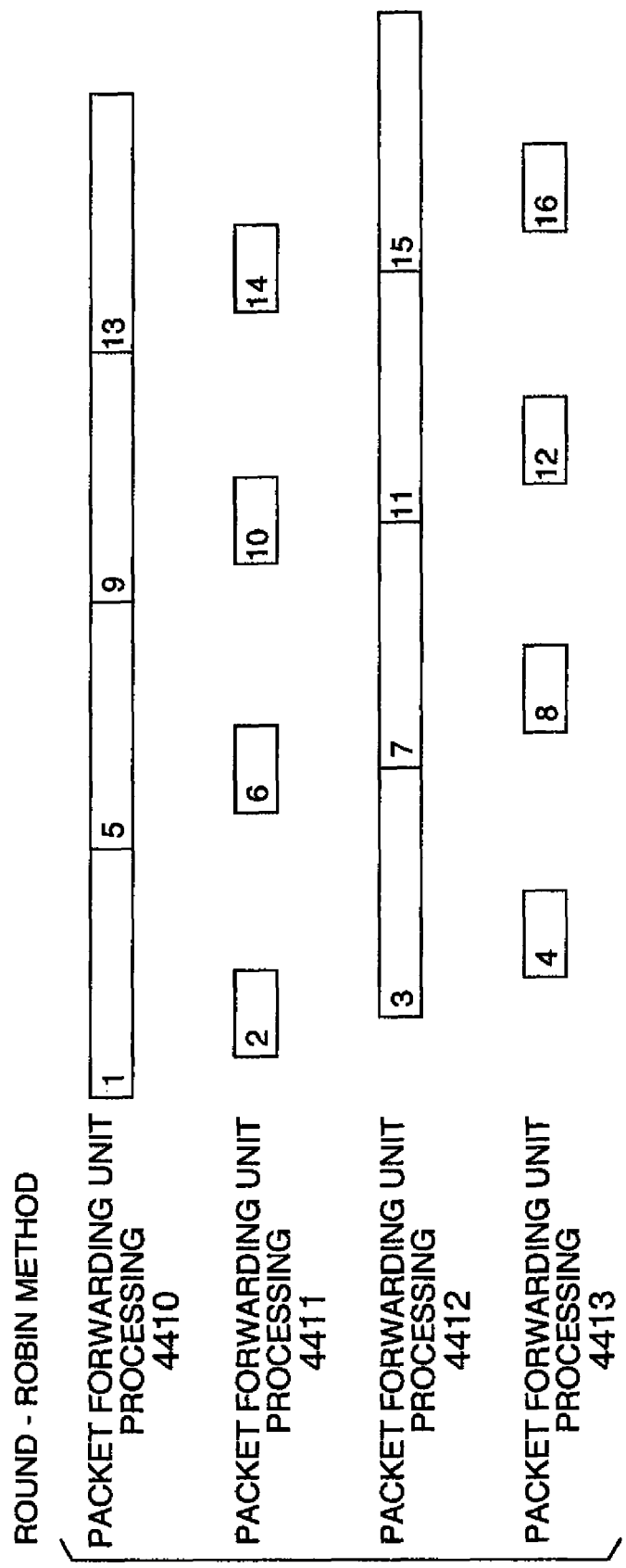
FIG. 11 is a time chart showing packet forwarding processing of packet forwarding units in the case where a round-robin method is used as a distributing method in a forward packet distribution units.
Figure 12:
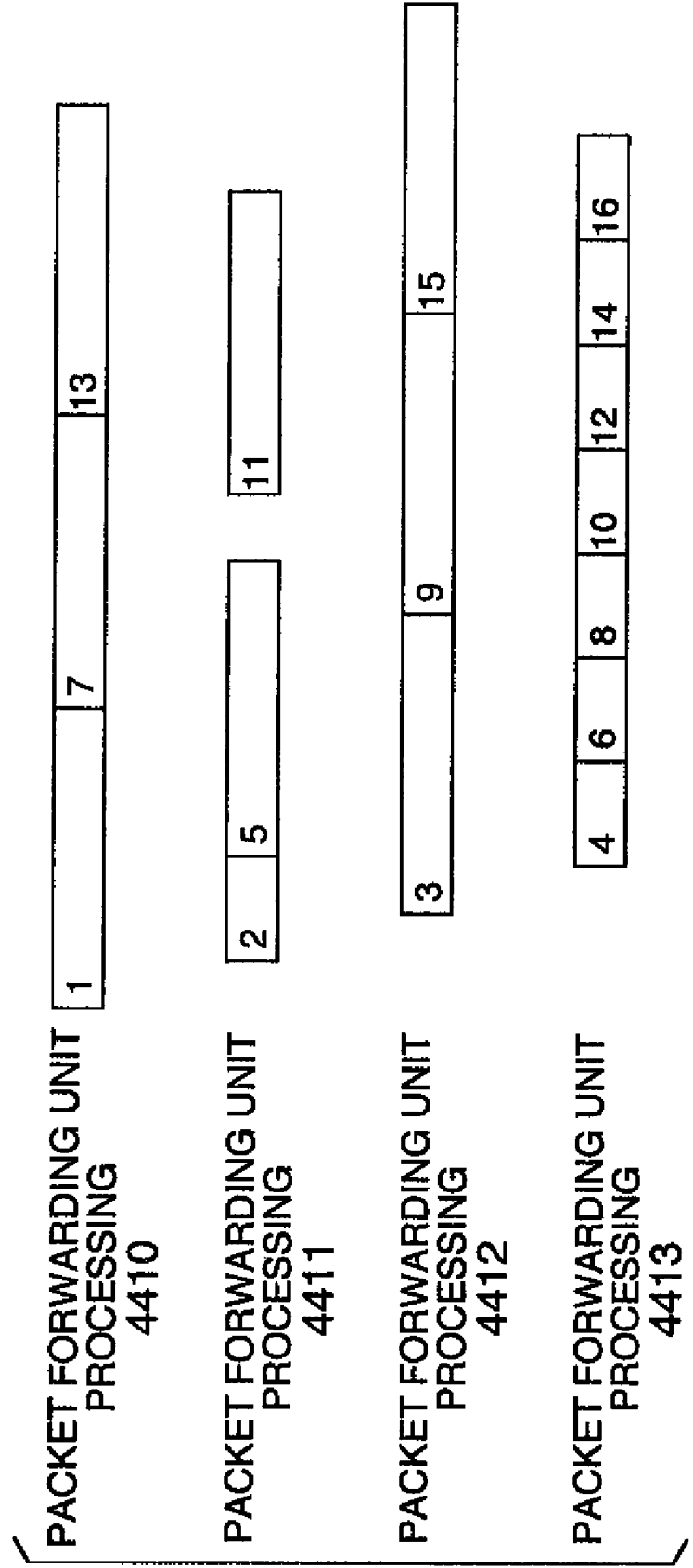
FIG. 12 is a time chart showing packet forwarding processing of packet forwarding units in the case where an out-of-order method is-used as a distributing method in a forward packet distribution units.
Figure 13:
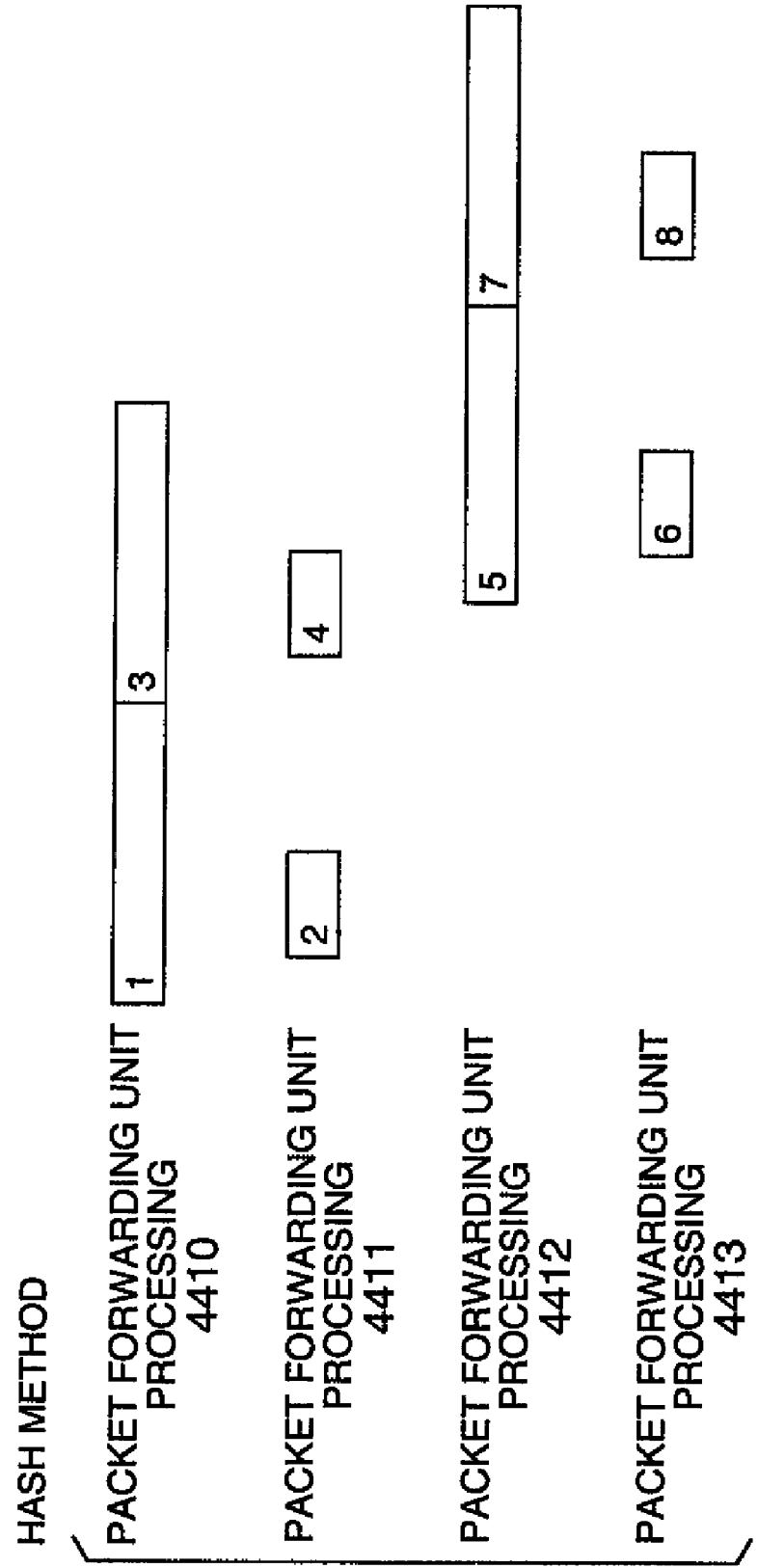
FIG. 13 is a time chart showing packet forwarding processing of packet forwarding units in the case where a hash method is used as a distributing method in a forward packet distribution units.

Forward packet distribution units 4420 and 4422 (FIG. 3) and 4430 and 4432 (FIG. 4) perform a process by which a packet sent from the NIF or CSW is distributed to any one of the plurality of packet forwarding units. A round-robin method, an out-of-order method, a hash method, or the like, is used as a packet distributing method. The round-robin method is a method in which packets are distributed to the packet forwarding units in the entering order. The out-of-order method is a method in which packets are distributed to empty ones of the packet forwarding units. The hash method is a method in which a packet forwarding unit to be assigned for a packet is determined univocally on the basis of the header condition of the packet. FIG. 11 is a time chart showing a packet forwarding process in each of the packet forwarding units in the case where a round-robin method is used as the packet distributing method in the forward packet distribution units. FIG. 12 is a time chart showing a packet forwarding process in each of the packet forwarding units in the case where an out-of-order method is used as the packet distributing method in the forward packet distribution units. FIG. 13 is a time chart showing a packet forwarding process in each of the packet forwarding units in the case where a hash method is used as the packet distributing method in the forward packet distribution units. In each of the time charts of FIGS. 11, 12 and 13, the numeral references show a sequence of packets input into the RP 440, and the length of each rectangle shows the time required for the packet forwarding unit to process the packet, Each of FIGS. 11, 12 and 13 shows the case where packets long in processing time enter as odd-numbered packets and packets short in processing time enter as even-numbered packets.

For example, a function (hash function) used in the hash method to determine a forwarding address of a packet is provided with a condition that a series of packets to be continuously sent from a sender address to a forwarding address must be all distributed to one packet forwarding unit. Under this condition, the series of packets to be continuously sent from the sender address to the forwarding address can be delivered from the sender address to the forwarding address in the entering order after the packets are sent in the order of finishing of the packet forwarding process even in the case where the time required for each packet forwarding process varies.

Moreover, a pseudo-random number sequence generated on the basis of the packet header condition may be used as the hash function so that packets can be distributed to the packet forwarding units as uniformly as possible. As an example of the hash function in the case where two packet forwarding units are provided, there is a method of exclusively ORing all bits of a 32-bit source IP address and all bits of a 32-bit destination IP address. In this case, to which one of the two forwarding units the packet is to be assigned is determined on the basis of one bit obtained by exclusive ORing of all bits. When four packet forwarding units are provided, a hash function capable of outputting not one bit but two bits is used. FIG. 13 shows the case where the first and third packets are assigned to the packet forwarding unit 4410, the second and fourth packets are assigned to the packet forwarding unit 4411, the fifth and seventh packets are assigned to the packet forwarding unit 4412, and the sixth and eighth packets are assigned to the packet forwarding unit 4413.

When a round-robin method or an out-of-order method is used as a distributing method in the forward packet distribution units 4420 and 4422 (FIG. 3) and 4430 and 4432 (FIG. 4), the forward packet rearrangement units 4421 and 4423 (FIG. 3) and 4431 and 4433 (FIG. 4) rearrange packets in the order of the packets entering the router 4 after the packet forwarding units 4400 to 4407 (FIG. 3) and 4410 to 4413 (FIG. 4) have finished the packet forwarding processes. This order rearrangement is made because the order of completion of the packet forwarding process in the packet forwarding units 4400 to 4407 (FIG. 3) and 4410 to 4413 (FIG. 4) in the RP may be reversed to the entering order of the series of packets to be continuously sent from the sender address to the destination address. When an out-of-order method is used as a distributing method in the forward packet distribution units 4420 and 4422 (FIG. 3) and 4430 and 4432 (FIG. 4), packets are numbered sequentially when the forward packet distribution units 4420 and 4422 (FIG. 3) and 4430 and 4432 (FIG. 4) assign the packets to the packet forwarding units 4400 to 4407 (FIG. 3) and 4410 to 4413 (FIG. 4) so that the forward packet rearrangement units 4421 and 4423 (FIG. 3) and 4431 and 4433 (FIG. 4) can rearrange the packets in the order of the packets entering the router 4. In this case, the packets are taken around with the sequence numbers in the packet forwarding units 4400 to 4407 (FIG. 3) and 4410 to 4413 (FIG. 4), so that the forward packet rearrangement units 4421 and 4423 (FIG. 3) and 4431 and 4433 (FIG. 4) rearrange the packets in the order of the sequence numbers assigned to the packets, and send out the rearranged packets.

When a hash method is used as a distributing method in the forward packet distribution units 4420 and 4422 (FIG. 3) and 4430 and 4432 (FIG. 4), the packet output order may be changed or disordered among the packets sent to any one of the packet forwarding units 4400 to 4407 (FIG. 3) and 4410 to 4413 (FIG. 4). In this case, the corresponding one of the forward packet rearrangement units 4421 and 4423 (FIG. 3) and 4431 and 4433 (FIG. 4) may send out the packets in the order of termination of the packet forwarding process. When the packet forwarding process is terminated in the plurality of packet forwarding units 4400 to 4407 (FIG. 3) and 4410 to 4413 (FIG. 4), the packet forwarding units 4400 to 4407 (FIG. 3) and 4410 to 4413 (FIG. 4) send out the packets in the order of termination of the packet forwarding process.

Figure 5:
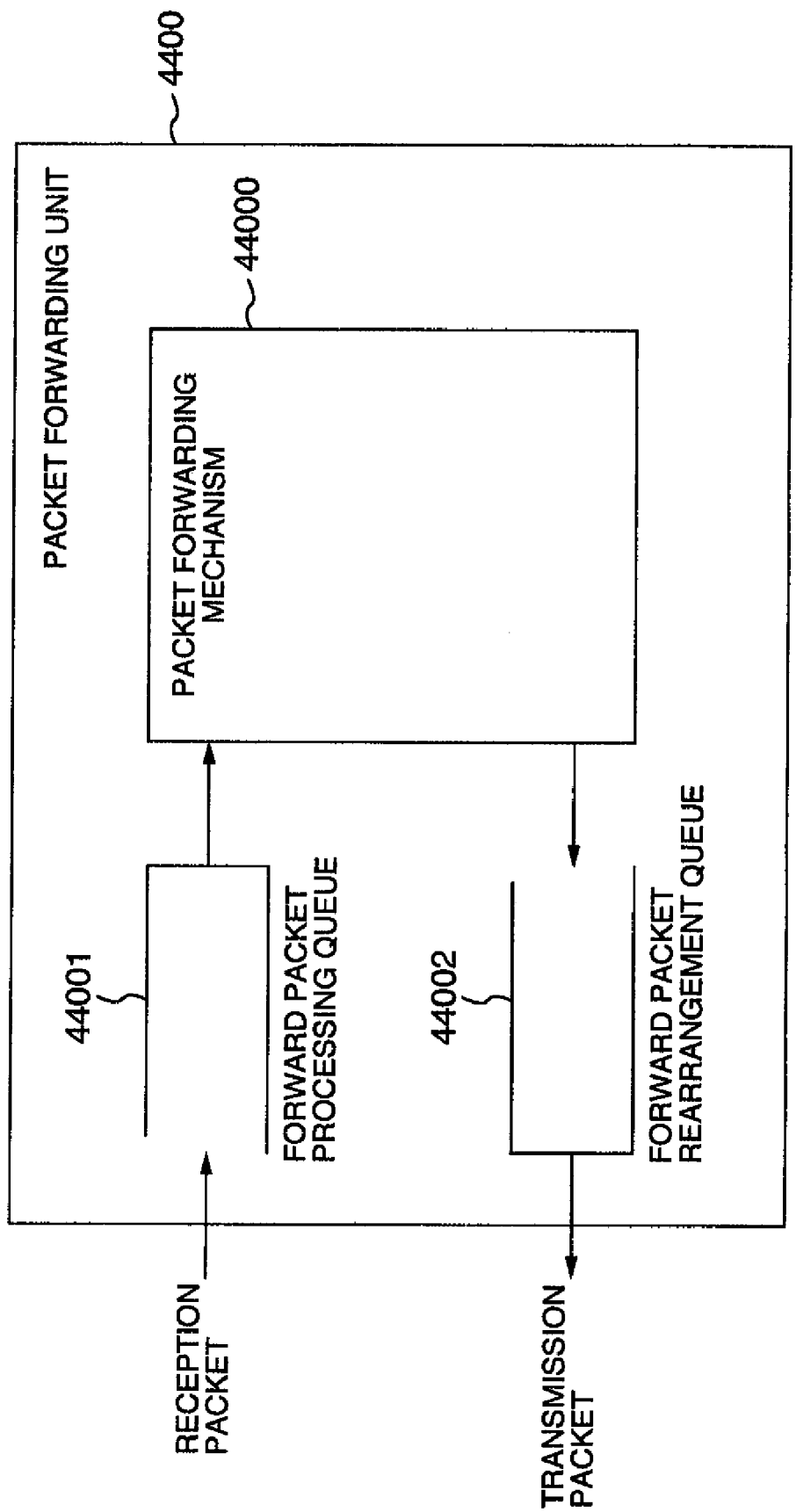
FIG. 5 is a block diagram showing the internal configuration of a packet forwarding unit according to an embodiment of the present invention.

Next, FIG. 5 is a block diagram showing the internal configuration of a packet forwarding unit in the present invention.

The packet forwarding units 4400 to 4407 (FIG. 3) or 4410 to 4413 (FIG. 4) have similar ways to have queues waiting for internal processing though they are different in the packet forwarding direction, that is, they are directed in the direction from the NIF 450 to the CSW 43 or from the CSW 43 to the NIF 450. FIG. 5 is a block diagram showing the way that the packet forwarding unit 4400 as a representative has internal processing queues waiting for the packet processing. In FIG. 5, the packet forwarding unit 4400 has a packet forwarding mechanism 44000 for executing a packet forwarding process, a forward packet processing queue 44001 waiting for the start of packet processing in the packet forwarding mechanism 44000 after assignment of packets to the packet forwarding unit 4400 by the forward packet distribution unit 4420, or the like, and a forward packet rearrangement queue 44002 waiting for the rearrangement and output of the packets by the forward packet rearrangement unit 4421, or the like, after the completion of processing in the packet forwarding mechanism 44000.

The forward packet processing queue 44001 and the forward packet rearrangement queue 44002 absorb the deviation of the packet processing time in the packet forwarding unit 4400, or the like, and absorb the deviation of the time required for distributing packets to the packet forwarding unit 4400, or the like, if a hash method is used as a distributing method in the forward packet distribution unit 4420, or the like. There is an effect that the idle time of the packet forwarding unit 4400, or the like, is shortened.

Figure 6:
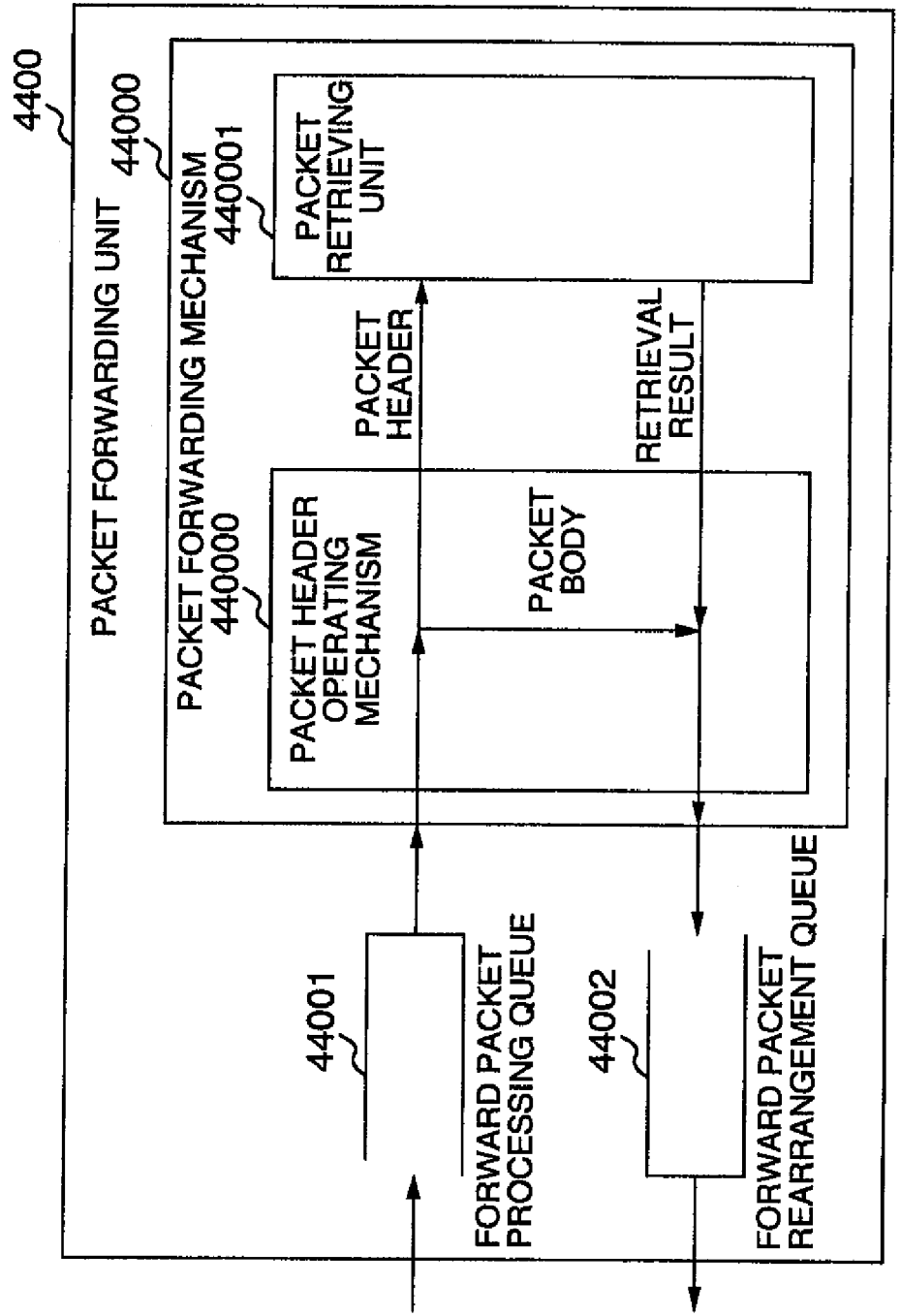
FIG. 6 is a block diagram showing the internal configuration of a packet forwarding unit and a packet forwarding mechanism contained in the packet forwarding unit in the case where packet retrieving units are not arranged in parallel to one another.
Figure 7:
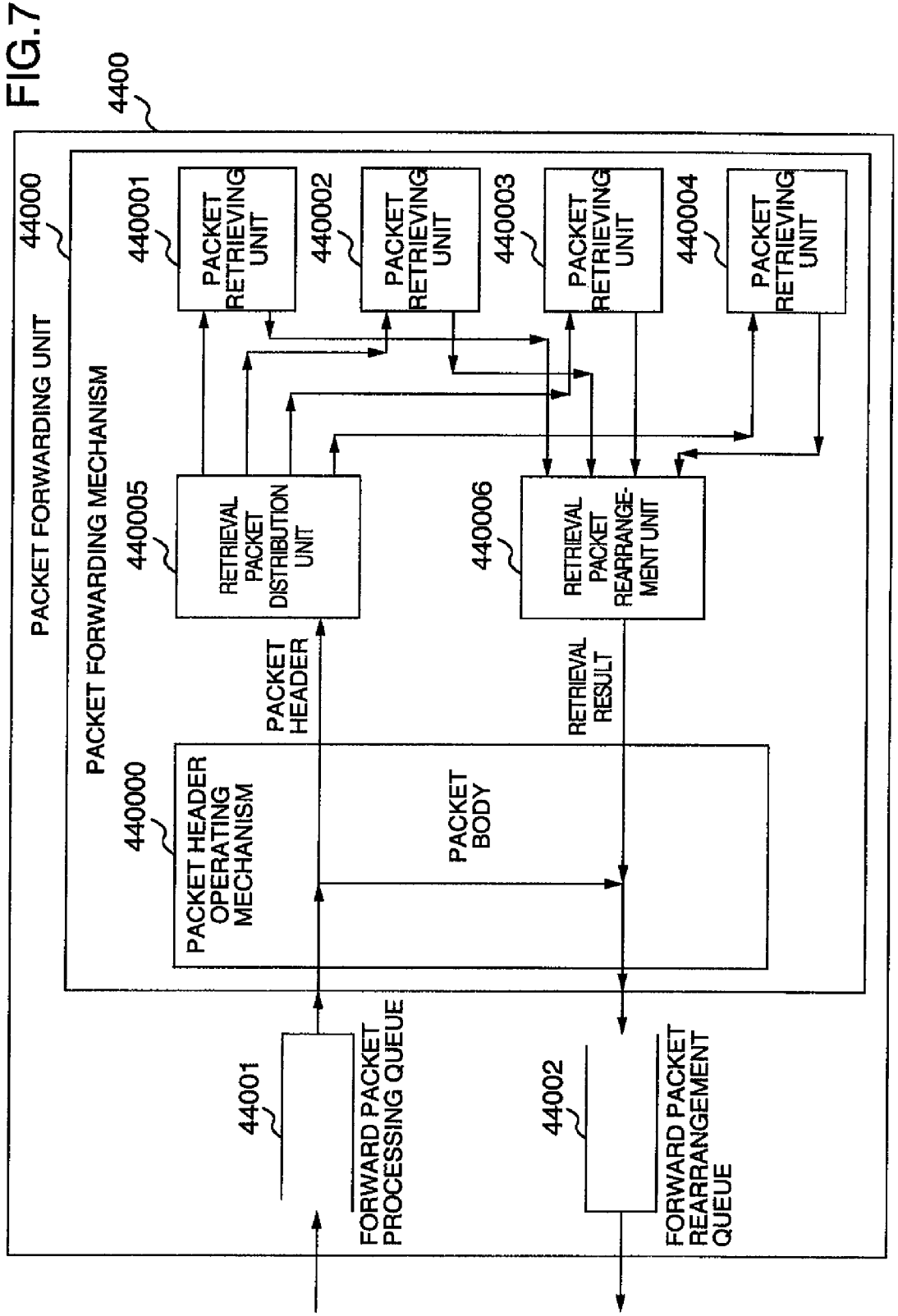
FIG. 7 is a block diagram showing the internal configuration of a packet forwarding unit and a packet forwarding mechanism contained in the packet forwarding unit in the case where packet retrieving units are arranged in parallel to one another.

An embodiment will be described below in the case where packet retrieving portions in the packet forwarding unit 4400 are arranged in parallel to one another in order to attain high-speed processing. FIG. 6 is a block diagram of the internal configuration of the packet forwarding unit 4400 and the packet forwarding mechanism 44000 contained in the packet forwarding unit 4400 in the case where packet retrieving units for retrieving the packet headers are not arranged in parallel. FIG. 7 shows the diagram of the internal configuration of the packet forwarding unit 4400 and the packet forwarding mechanism 44000 contained in the packet forwarding unit 4400 in the case where packet retrieving units are arranged in parallel to one another.

In FIG. 6, the packet forwarding mechanism 44000 has a packet header operating mechanism 440000, and a packet retrieving unit 440001. The packet header operating mechanism 440000 extracts header portions of packets and delivers the header portions to the packet retrieving unit 440001. The packet retrieving unit 440001 retrieves forwarding addresses of the packets on the basis of the packet header-information sent from the packet header operating mechanism 440000, retrieves the packets to be aborted or to be forwarded (filtering retrieval), retrieves output priority of the packets (communication quality retrieval), and so on. The packet retrieving unit 440001 delivers information concerning the forwarding addresses of the packets, information as to whether the packets are to be aborted or not, information concerning the output priority of the packets, and so on, to the packet header operating mechanism 440000. The packet header operating mechanism 440000 forwards or aborts the packets on the basis of the information delivered by the packet retrieving unit 440001, such as information concerning the forwarding addresses of the packets and information as to whether the packets are to be aborted or to be forwarded.

FIG. 7 shows the configuration of the packet forwarding unit 4400 in the case where packet retrieving units are arranged in parallel to one another. The packet forwarding unit 4400 has a packet forwarding mechanism 44000. The packet forwarding mechanism 44000 has a packet header operating mechanism 440000, packet retrieving units 440001 to 440004 each equivalent to the packet retrieving unit 440001 shown in FIG. 6, a retrieval packet distribution unit 440005 for assigning a packet header retrieving process to one of the packet retrieving units 440001 to 440004 in the packet forwarding mechanism 44000, and a retrieval packet rearrangement unit 440006 for rearranging retrieval results of the packet retrieving units 440001 to 440004.

A round-robin method, an out-of-order method or a hash method can be used as a packet retrieving unit distributing method in the retrieval packet distributing unit 440005 in the same manner as that in the forward packet distribution units 4420 and 4422 (FIG. 3) and 4430 and 4432 (FIG. 4). The characteristic of each distributing technique is the same as that used in the forward packet distribution units. The same rearranging method as that used in the forward packet rearrangement units 4421 and 4423 (FIG. 3) and 4431 and 4433 (FIG. 4) is applied to rearrangement in the retrieval packet rearrangement unit 440006.

Figure 8:
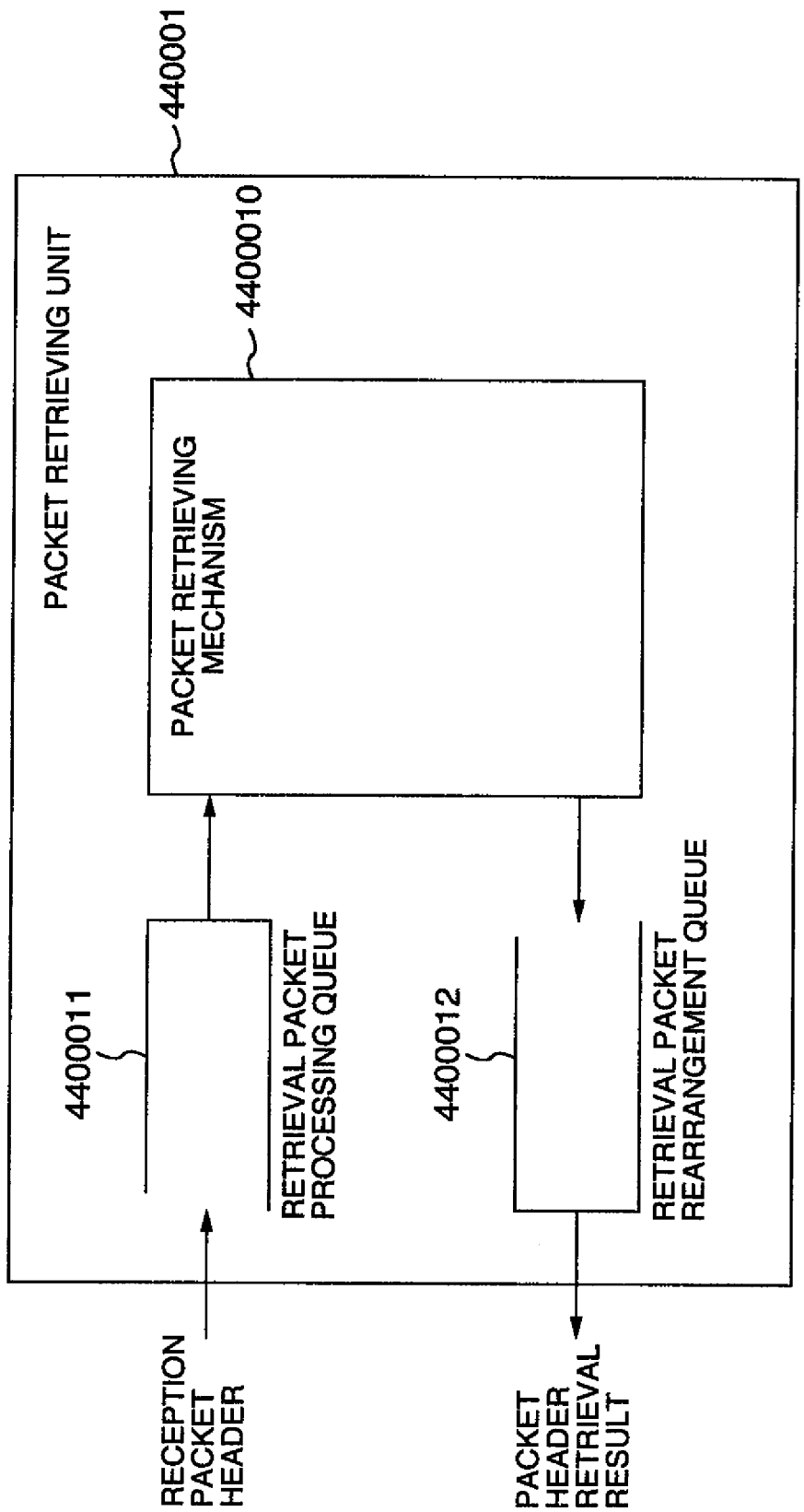
FIG. 8 is a block diagram showing the internal configuration of a packet retrieving unit in an embodiment of the present invention.

FIG. 8 shows the diagram of the internal configuration of a packet retrieving unit in the present invention.

The packet retrieving units 440001 to 440004 shown in FIG. 7 are equal in the way that each of the units has queues waiting for internal processing. FIG. 8 is a block diagram showing the way that the packet retrieving unit 440001 as a representative has queues waiting for internal processing. In FIG. 8, the packet retrieving unit 440001 has a packet retrieving mechanism 4400010 for executing a packet retrieving process, a retrieval packet queue 4400011 waiting for the start of packet processing in the packet retrieving mechanism 4400010 after assignment of packets to the packet retrieving unit 440001, or the like, by the retrieval packet distribution unit 440005, and a retrieval packet rearrangement queue 4400012 waiting for the rearrangement and output of packets in the retrieval packet rearrangement unit after completion of processing in the packet retrieving mechanism.

The retrieval packet processing queue 4400011 and the retrieval packet rearrangement queue 4400012 absorb the deviation of the packet processing time in the packet retrieving unit 440001, or the like, and absorb the deviation of the time required for distributing packets to respective packet retrieving units when a hash method is used as a distributing method in the retrieval packet distribution unit. There is an effect that the idle time of the respective packet retrieving units is shortened.

A method of picking up statistical information will be described below in the case where the aforementioned packet forwarding units 4400 to 4407 (FIG. 3) or 4410 to 4413 (FIG. 4) or the packet retrieving units 440001 to 440004 are arranged in parallel to one another. For example, in the packet forwarding units 4400 to 4407 (FIG. 3) or in the packet forwarding units 4410 to 4413 (FIG. 4), the number of packets and the number of bytes in packets subjected to the forwarding process and the number of packets aborted by filtering in the router or by traffic congestion of packets in the router are counted. In the packet retrieving units 440001 to 440004, the number of (non-routed) packets undefined in terms of output address, the number of packets addressed to the router itself, the number of packets satisfying the aborting condition owing to filtering, and so on, are counted as a result of retrieval (routing retrieval) of packet output address.

In the present invention, the packet forwarding units 4400 to 4407 (FIG. 3), the packet forwarding units 4410 to 4413 (FIG. 4) or the packet retrieving units 440001 to 440004 are arranged in parallel to one another. Hence, to pick up the aforementioned statistical information in the packet forwarding units 4400 to 4407 (FIG. 3), the packet forwarding units 4410 to 4413 (FIG. 4) or the packet retrieving units 440001 to 440004, a software program operating on the RM 42 shown in FIG. 2, or a processor is provided in each of the RPs 440 to 442 shown in FIG. 2 so that a software program is operated on the processor. The software program read statistical information picked up in the packet forwarding units 4400 to 4407 (FIG. 3), the packet forwarding units 4410 to 4413 (FIG. 4) or the packet retrieving units 440001 to 440004 so that the statistical information picked up in all the parallel packet forwarding units 4400 to 4407 (FIG. 3), all the parallel packet forwarding units 4410 to 4413 (FIG. 4) or all the parallel packet retrieving units 440001 to 440004 is added up.

Figure 9:
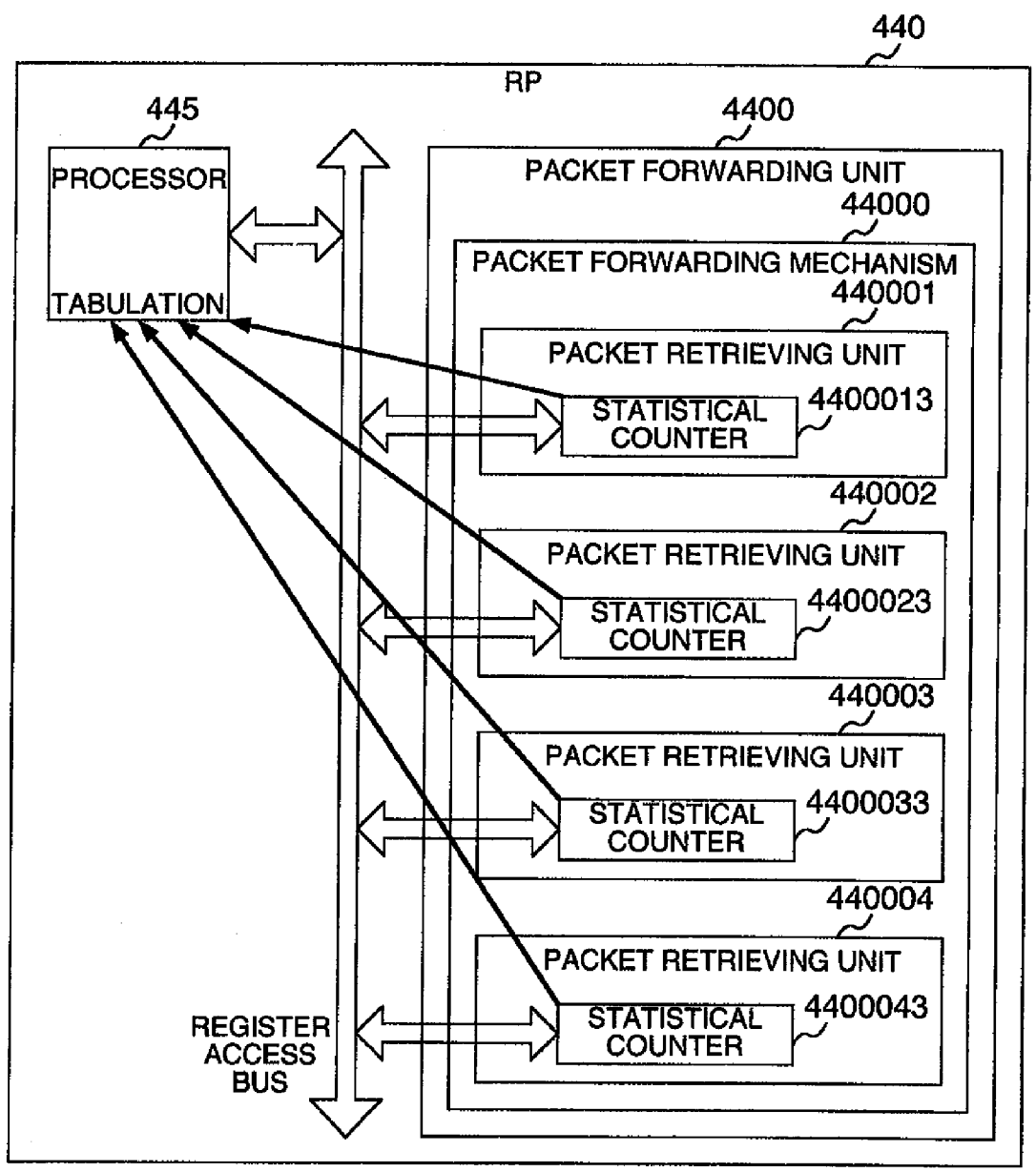
FIG. 9 is a conceptual diagram showing a process in which statistical information picked up in packet retrieving units is read and tabulated in a routing processor.

FIG. 9 is a conceptual diagram showing a process in which statistical information picked up in the packet retrieving units in the present invention is read and tabulated in the routing processor.

In FIG. 9, the packet retrieving units 440001 to 440004 in the packet forwarding mechanism 44000 have statistical counters 4400013 to 4400043 respectively. The values of the statistical counters 4400013, 4400023, 4400033 and 4400043 picked up in the packet retrieving units 440001 to 440004 respectively are read and tabulated by the processor 445 in the RP 440 through a register access bus. Portions not directly related to collection of packets are not shown in FIG. 9.

Further, functions other than the statistical function may be required as follows in the case where the number of packet data transfer bytes needs to be measured. When, for example, a network provider receives packets from users, the packets are classified into several groups (hereinafter referred to as "flows") on the basis of the header conditions of the packets. Data transfer rate of each flow is monitored whenever this classification is made. When the data transfer rate in this flow is too high, packets sent from the users in the flow over the bandwidth on the basis of contracts between the network provider and the users may be aborted or preferentially aborted at the time of traffic congestion. This function is called "bandwidth policing function". Further, when network users transmit packets to a network of a network provider, the output rate of packet data belonging to the flow of the network provider may be limited, by a router, within the bandwidth on the basis of a contract between the router and the network provider. This function is called "shaping function". To achieve the bandwidth policing function or the shaping function, the number of data transfer bytes (data transfer rate) of packets flowing in the router needs to be measured at intervals of a predetermined time.

When a plurality of packet forwarding units 4400 to 4407 (FIG. 3), a plurality of packet forwarding units 4410 to 4413 (FIG. 4) or a plurality of packet retrieving units 440001 to 440004 are arranged in parallel to one another, one flow is distributed and processed to the plurality of packet forwarding units 4400 to 4407 (FIG. 3), the plurality of packet forwarding units 4410 to 4413 (FIG. 4) or the plurality of packet retrieving units 440001 to 440004. Therefore, to obtain the total data transfer rate of one flow, the data transfer rate of the flow in the respective packet forwarding units 4400 to 4407 (FIG. 3), the respective packet forwarding units 4410 to 4413 (FIG. 4) or the respective packet retrieving units 440001 to 440004 needs to be picked up at a common point. To pick up the data transfer rate of one flow at a common point, the flows are numbered. As one of packet header retrieval results, the flow numbers are outputted from the respective packet forwarding units 4400 to 4407 (FIG. 3), the respective packet forwarding units 4410 to 4413 (FIG. 4) or the respective packet retrieving units 440001 to 440004 so that the data transfer rate of the flow in accordance with the flow numbers is measured in the forward packet rearrangement unit 4421, 4423, 4431 or 4433 or the retrieval packet rearrangement unit 440006. When the bandwidth policing function is achieved, packets are aborted or packets are aborted easily in accordance with the data flow rate of the flow (if, for example, the data transfer rate of the flow reaches or exceeds a threshold). Furthermore, traffic statistical information can be obtained in accordance with the flow numbers. Further, when the shaping function is achieved, the output is limited by the router so that the data transfer rate of the flow does not exceed the bandwidth on the basis of a contract between the network provider and the router.

Figure 10:
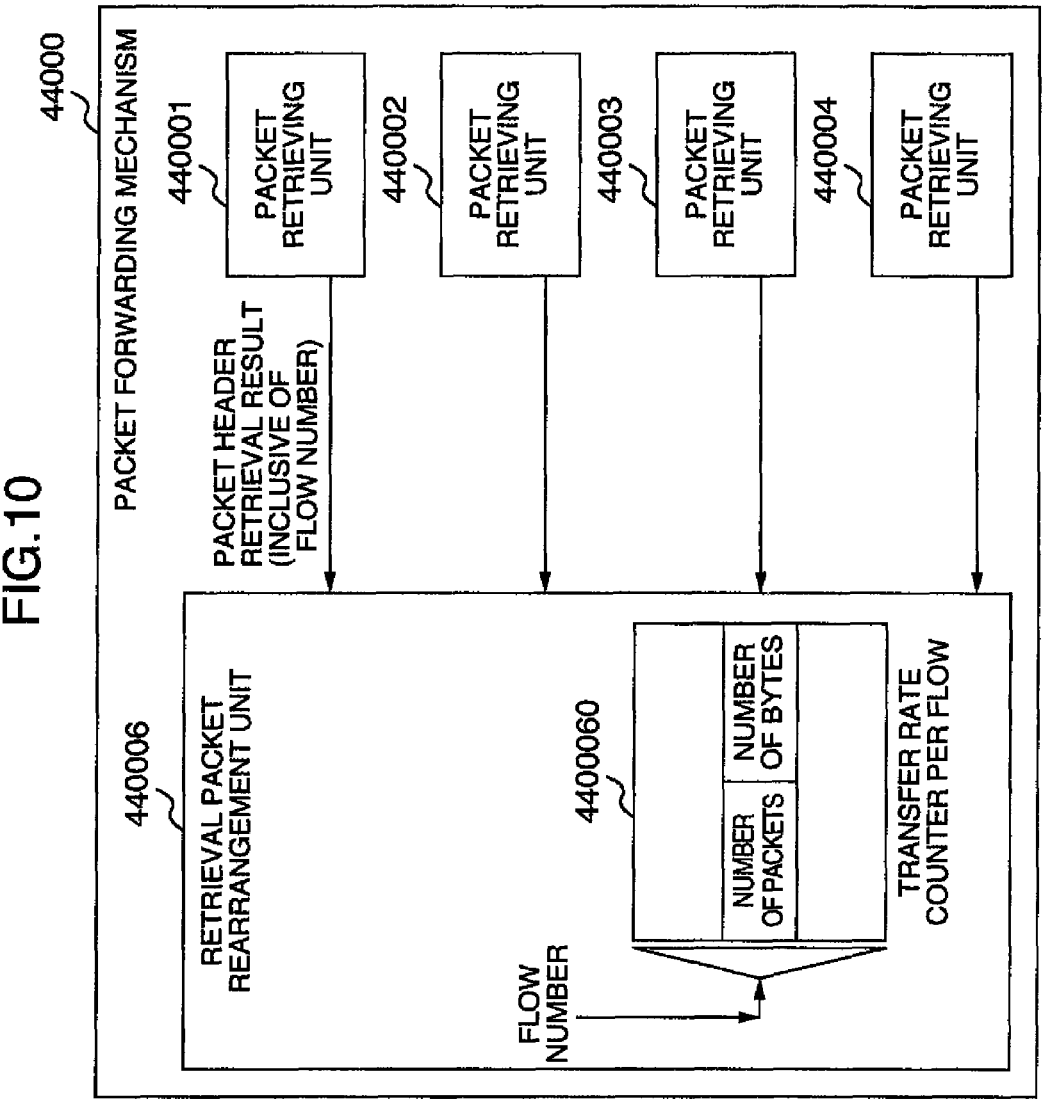
FIG. 10 is a block diagram showing the internal configuration of a packet forwarding mechanism which shows an extracted portion in which a retrieval packet rearrangement unit measures a transfer rate of the flow in accordance with each of flow numbers retrieved by a plurality of packet retrieving units.

FIG. 10 is a block diagram showing the internal configuration of a packet forwarding mechanism which shows an extracted portion in which a retrieval packet rearrangement unit measures the respective data transfer rate of the flow in accordance with each of flow numbers retrieved by a plurality of packet retrieving units in the present invention. The retrieval packet rearrangement unit 440006 has a transfer rate counter 4400060 which is provided for each flow numbers so that information concerning the packet data transfer rate for each flow such as the number of packets and the number of bytes for each flow is stored in the transfer rate counter 4400060 in accordance with the flow number. The packet retrieving units 440001 to 440004 output information containing the flow number as one of packet retrieval results. The retrieval packet rearrangement unit 440006 makes the transfer rate counter 4400060 measure the packet data transfer rate of each flow in accordance with the flow numbers. Portions not directly related to the measurement of the packet data transfer rate of each flow are not shown in FIG. 10.

Figure 14:
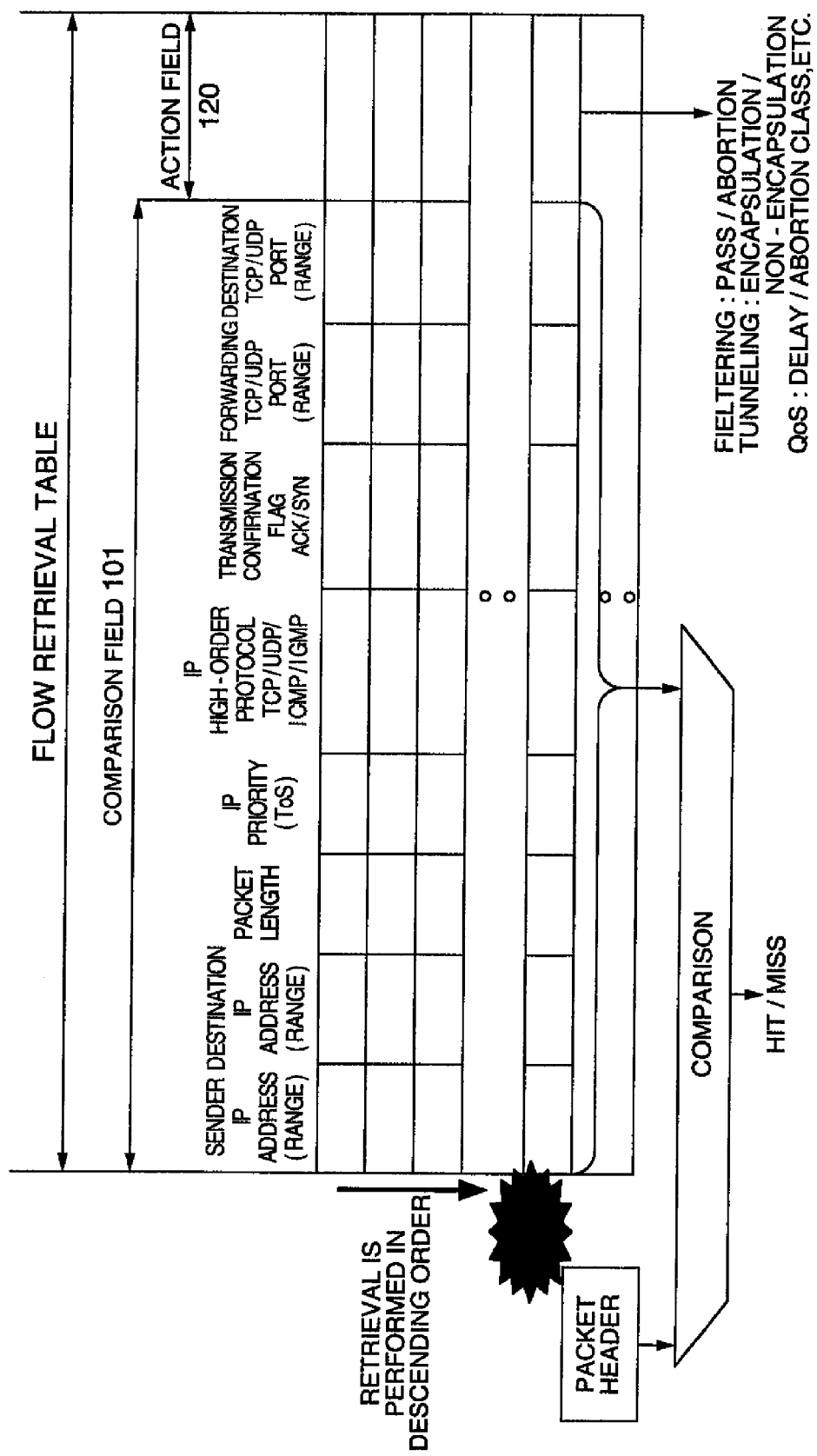
FIG. 14 is a diagram showing a flow retrieval table.

Flow retrieval will be described below. FIG. 14 is a view for explaining a flow retrieval table.

As shown in FIG. 14, for example, the flow retrieval table contains, as a comparison field 101, sender IP address, destination IP address, packet length, IP priority, IP high-order protocol, delivery confirmation flag, forwarding TCP/UDP port, and designation TCP/UDP port, and contains, as an action field 102, filtering (pass/abortion), tunneling (encapsulation/non-encapsulation) and QoS (delay class, abortion class, bandwidth, etc.).

A specific method of QoS flow retrieval will be described below. Paying attention to the QoS flow retrieval, description will be made by way of example. The same rule can be applied to various kinds of flow retrieval. Incidentally, the aforementioned flow control information may be mixedly stored in the action field 102 or such a flow retrieval table may be provided for each flow.

First, a linear search system will be described below. When QoS control information of a packet is judged as one of actions, entries set in advance are read from an entry table in the descending order. Then, the judgement is made as to whether the QoS control information coincides with the value of the header portion of the packet and all the effective flow conditions in the comparison field 101 in this entry or not. When coincidence is obtained, the QoS control information in the action field 102 in this entry is judged as QoS control information of the packet and the QoS flow retrieval is terminated. When coincidence with the flow condition is retrieved, the QoS control information in the action field 102 is decided as QoS control information and the flow retrieval is terminated without executing retrieval in the next entry.

In the aforementioned linear search system, it may be difficult to execute QoS control or filtering at a high speed in a network having a great deal of entries set therein. Therefore, an input circuit limiting system, or the like, may be preferably used because the input circuit limiting system can perform flow retrieval at a high speed in comparison with the linear search system even in the case where a great deal of entries are set. The input circuit limiting system will be described below in brief. In the input circuit limiting system, only the entry coincident with the input circuit number constituting the comparison field of the linear search system is retrieved to attain high-speed processing.

Figure 15:
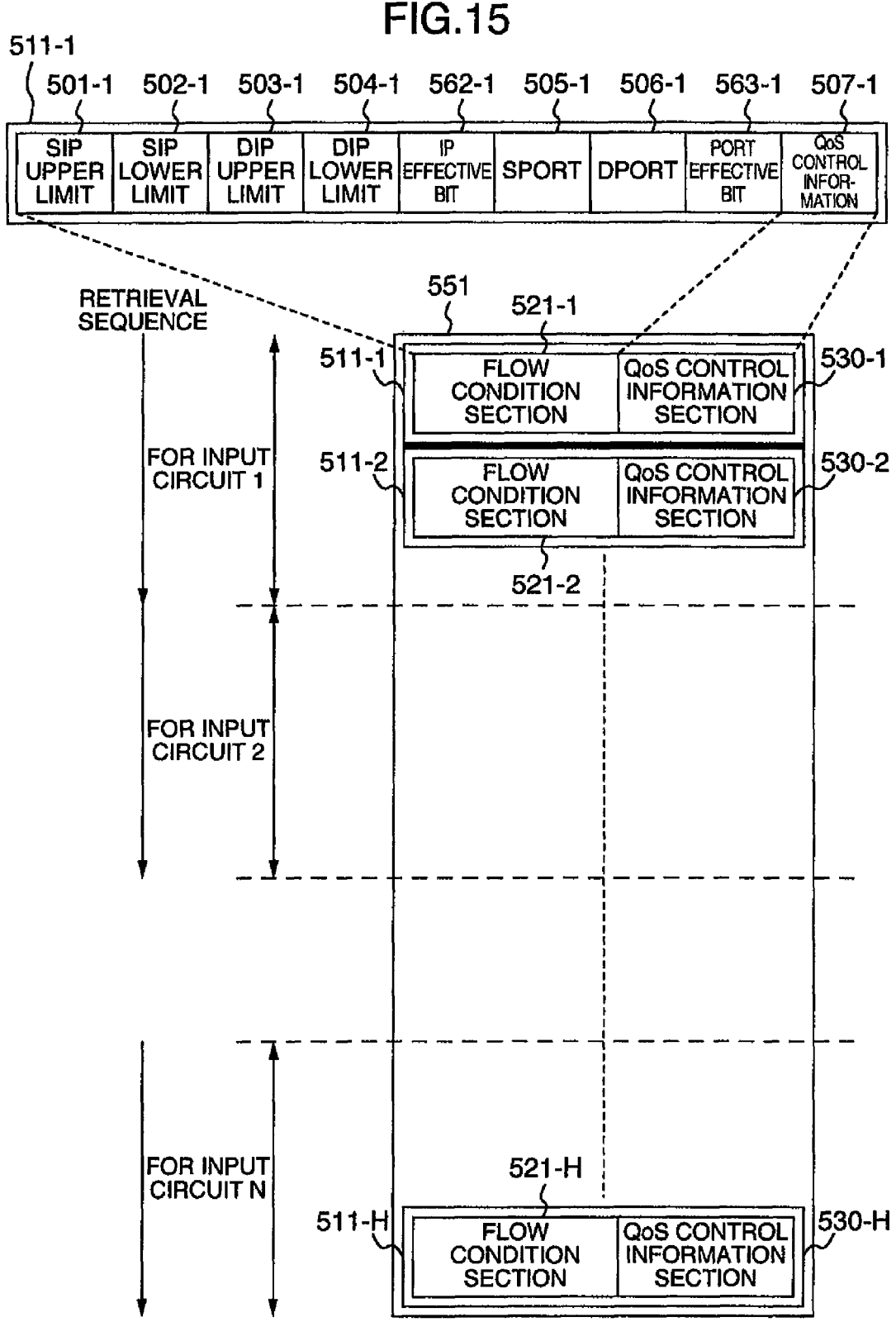
FIG. 15 is a diagram showing a first input circuit limiting system.

FIG. 15 is a diagram for explaining the first input circuit limiting system. In the first input circuit limiting system, an entry 511-$i$ obtained by removing the input circuit number and the input circuit number effective bit from the comparison field of the linear search system is set in accordance with the corresponding input circuit. For example, a flow condition portion 521-$i$ contains an SIP upper limit 501, an SIP lower limit 502, a DIP upper limit 503 and a DIP lower limit 504 as conditions for identifying a sender and a destination user. The flow condition portion 521-I further contains an IP effective bit 562 indicating that the upper and lower bits of SIP and DIP are effective, an SPORT 505 as a sender port, a DPORT 506 as a destination port, a port effective bit 563 indicating that the SPORT 505 and the DPORT 506 are effective, and so on. For example, a QoS control information portion 530-$i$ contains QoS control information 507 used with a preferential forwarding function. Because only the entry 511-$i$ coincident with the input circuit number as a flow condition is retrieved, the input circuit number need not be set in the entry 511-$i$. At the time of flow retrieval, only the entry 511-$i$ assigned to the input circuit to which a packet is input is retrieved.

When an entry 511-$i$ not related to an input circuit number is to be set in the first input circuit limiting system (for example, when traffic of Telnet inputted through all input circuits is set as "high priority"), it is necessary to set the entry 511-$i$ in the input circuit number (=N). In this case, the efficiency of memory for achieving the entry table may be worsened. Therefore, a higher-speed input circuit limiting system will be described below.

Figure 16:
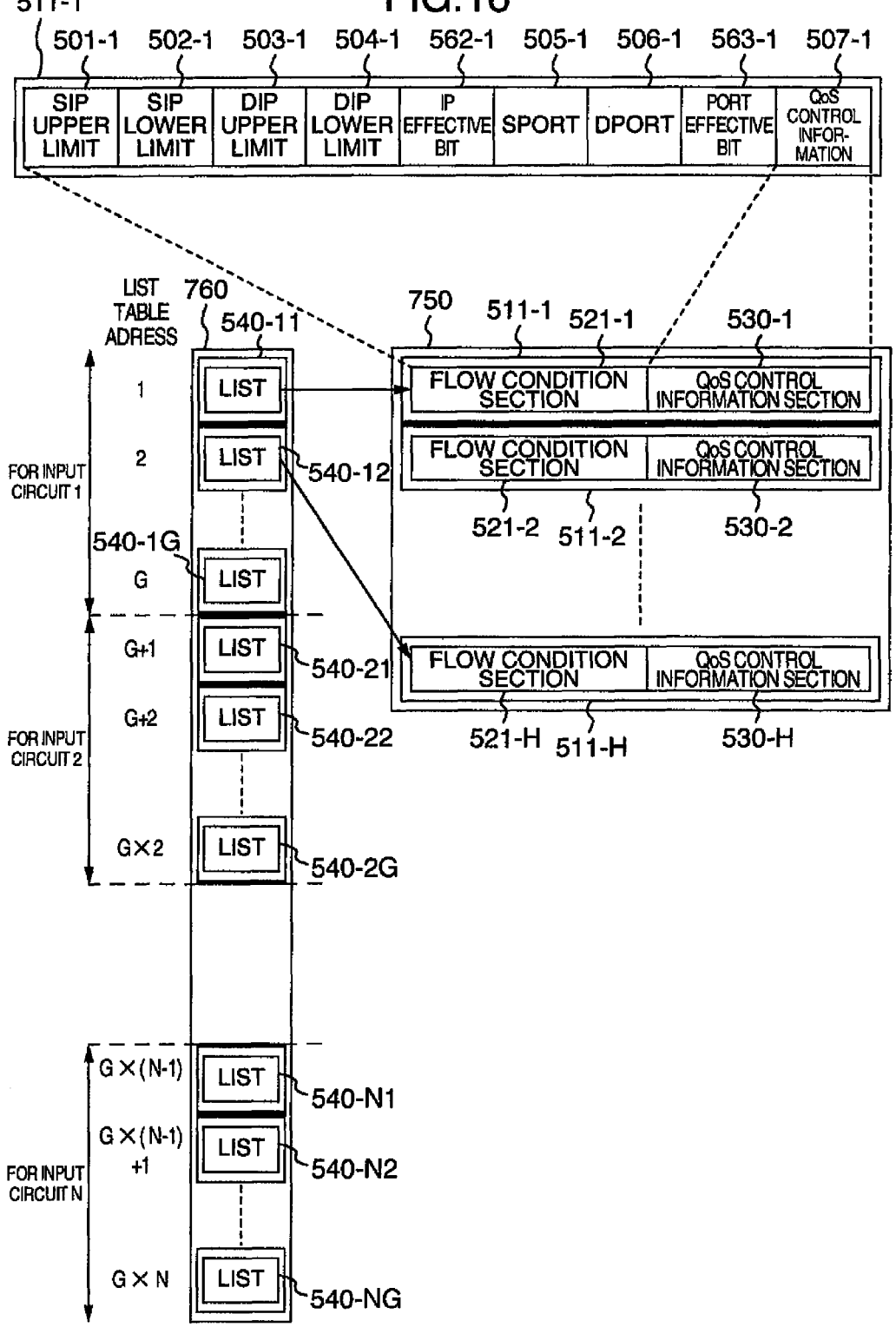
FIG. 16 is a diagram showing a second input circuit limiting system.

FIG. 16 is a diagram for explaining the second input circuit limiting system. In the second circuit limiting system, a list

540-*ij* which is an address of an entry table 750 is set in a list table for every input circuit. For example, a list 540-11 having the list table address "1" shows an address of an entry 511-1, and a list 540-12 having the list table address "2" shows an address of an entry 511-H. At the time of flow retrieval, only the lists 540-*ij* assigned to the corresponding input circuit through which a packet is supplied are read, so that the entry 511-*i* pointed by one list 540-*ij* is read. If a list 540-*ij* having a small bit width (for example, having about 10 bits per 1024 entries) is retained for every input circuit and an entry 511-*i* having a large bit width is shared to the respective input circuits, memory for achieving the entry table can be used effectively. Hence, a large number of entries 511-*i* can be set while high-speed processing is achieved.

An output circuit limiting system is another embodiment of the flow detecting system. In the output circuit limiting system, only the entry 511-*i* coincident with the output circuit number as a flow condition is processed in the same manner as that in the aforementioned input circuit limiting system to thereby achieve high-speed flow detection.

There is further an SAMAC limiting system using source addresses SAMAC of an MAC (Media Access Control) layer instead of the input circuit number of the header information as a flow condition. In the SAMAC limiting system, when an SAMAC group is defined as a group of source addresses SAMAC and the entry is limited by an SAMAC identifier which is an identifier of the SAMAC group, flow retrieval can be executed in the same manner as that in the aforementioned input limiting system.

Incidentally, parallel arrangement of packet forwarding units as shown in FIGS. 3 and 4 and parallel arrangement of packet retrieving units as shown in FIG. 7 can be executed simultaneously. When the two parallel arrangements are executed simultaneously, the degree of parallelism of packet retrieving units in each RP is obtained by multiplying the degree of parallelism of packet forwarding units and the degree of parallelism of packet retrieving units.

According to the aforementioned embodiment, a plurality of packet forwarding units for retrieving a designation address of packets on the basis of header information of the packets and for forwarding the packets are provided in each RP, and packets sent from the NIFs and packets sent from the CSW are distributed one by one to the packet forwarding units. Hence, the packet forwarding process can be performed at a high speed in accordance with the degree of parallelism of the packet forwarding uits.

According to the aforementioned embodiment, packet forwarding units by which packets sent from the NIFs are forwarded to the CSW may be provided separately from packet forwarding units by which packets sent from the CSW are forwarded to the NIFs. Hence, processing performed by the respective packet forwarding units can be limited to thereby simplify the configuration of the packet forwarding units.

According to the aforementioned embodiment, each of the packet forwarding units may be provided to serve as a unit for forwarding packets from the NIFs to the CSW and for forwarding packets from the CSW to the NIFs. Hence, the idle time of the respective packet forwarding units can be shortened to thereby improve the processing performance, per packet forwarding unit, of the router.

According to the aforementioned embodiment, a round-robin method in which packets are distributed sequentially to the packet forwarding units in entering order may be used as a packet distributing method in the forward packet distribution units. Hence, the packet distributing method is simple and can be achieved easily. According to the aforementioned embodiment, an out-of-order method in which packets are distributed to empty ones of the packet forwarding units may be used as a packet distributing method. Hence, even in the case where the packet processing time of the packet forwarding unit varies between packets, the idle time of the packet forwarding units can be shortened so that the packet forwarding performance per packet forwarding unit can be improved in view of the total performance of the router. According to the aforementioned embodiment, a hash method in which packet forwarding units used for distributing packets are univocally determined on the basis of the header conditions of the packets may be used as a packet distributing method. Hence, a series of packets to be continuously sent from the packet sender address to the forwarding address are all distributed to one packet forwarding unit. Hence, overtaking of the packets can be avoided without rearranging the order of the packets before sending of the packets. Further, a pseudo-random number sequence generated on the basis of the packet header conditions may be used as a hash function in the hash method so that packets are distributed to the packet forwarding units as uniformly as possible. Hence, the time deviation for the number of processed packets can be suppressed among the packet forwarding units.

According to the aforementioned embodiment, the packet rearrangement units perform rearrangement of packets outputted from the packet forwarding units to make the packets rearranged in the order of packets entering the RP. Hence, overtaking of the packets can be avoided. When an out-of-order method is used as a packet distributing method, packets may be numbered sequentially when the packets are distributed. When the packets are taken around with the sequence numbers in the packet forwarding units, the packet rearrangement units can detect the entering order of the packets and can rearrange the packets in the entering order of the packets.

According to the aforementioned embodiment, there may be provided a queue waiting for the start of the packet forwarding process after reception of a packet from the forward packet distribution unit into each of the packet forwarding units, and a queue waiting for sending of packets to the forward packet rearrangement unit after the completion of processing in the packet forwarding units. Hence, the queues can absorb the deviation of the packet processing time in the respective packet forwarding units and can absorb the deviation of the time required for distributing packets to the packet forwarding units when a hash method is used as a packet distributing method in the forward packet distribution unit. Hence, the idle time of the packet forwarding units can be shortened to thereby improve the processing performance, per packet forwarding unit, of the router.

According to the aforementioned embodiment, not the packet forwarding units but the packet retrieving units may be arranged in parallel to one another so that a process performed by the packet retrieving units can be limited to packet header retrieval, among the processes performed by the packet forwarding units. Hence, packet header retrieval which is so complex as to be apt to be a bottle neck among the processes required for every the packet can be performed by the parallel packet retrieving units at a high speed while increase in the number of hardware devices is suppressed.

According to the aforementioned embodiment, parallel arrangement of packet forwarding units and parallel arrangement of packet retrieving units may be executed simultaneously. Hence, the degree of parallelism of the process required for every packet in the router can be heightened to the degree of parallelism of packet forwarding units and the degree of parallelism of packet retrieving units. Hence, the total performance of the router can be improved more greatly.

According to the aforementioned embodiment, statistical information may be picked up in each of packet forwarding units or in each of packet retrieving units. Hence, a software program managing the router as a whole can read statistical information in each packet forwarding unit or in each packet retrieving unit. The information may be tabulated by the software program. Alternatively, a processor may be provided in each RP so that a software program operating on the processor can read statistical information in each packet forwarding unit or in each packet retrieving unit. When the information is tabulated by the software program, the total statistical information of the router can be obtained.

According to the aforementioned embodiment, the plurality of packet forwarding units or the plurality of packet retrieving units classify packets into several groups (hereinafter referred to "flows") in accordance with the header conditions of the packets. These flows are numbered, so that flow numbers are outputted from the packet forwarding units or the packet retrieving units. The data transfer rate of the flow is measured in the forward packet rearrangement units or in the retrieval packet rearrangement unit in accordance with the flow numbers. Hence, the total data transfer rate of the flow processed by all the packet forwarding units or by all the packet retrieving units can be measured. Hence, packets can be aborted in accordance with the data transfer rate or packets can be aborted easily at the time of traffic congestion. Or the sending rate of packets can be limited when the packets are sent out.

The invention claimed is:

1. A network routing method for use in a network routing apparatus which includes a plurality of packet forwarding units per outer network interface for connecting between a plurality of network routing apparatuses, with each of said packet forwarding units routing packets received from a network via a corresponding one of the outer network interfaces, comprising:
   a step of distributing packets received by one of the network interfaces into the plurality of packet forwarding units corresponding thereto;
   a step of performing a process of forwarding the packets thus distributed in each of the packet forwarding units, said process including retrieval of an address of a next routing apparatus in a network to which each packet thus distributed is to be forwarded; and
   a step of rearranging the plurality of packets performed with the process of forwarding in the packet forwarding units, based on the order in which the plurality of packets were received by the network interface corresponding thereto.

2. The network routing method according to claim 1, wherein the step of performing the process of forwarding the packets comprises:
   a substep of extracting header information from the packets thus distributed;
   a substep of distributing the header information thus extracted;
   a substep of retrieving the address of the next routing apparatus to which the packet thus distributed is to be forwarded in the network, based on the header information thus distributed; and
   a substep of rearranging results of retrieving the address of the next routing apparatus.

3. The network routing method according to claim 1, further comprising:
   a step of receiving the packets from a network interface provided in a network routing apparatus and connected with the network, or from a switch provided in a network routing apparatus; and
   a step of outputting the packets thus rearranged to the network interface or switch from which the packets are received.

4. The network routing method according to claim 1, wherein
   the step of distributing the packets includes a process of giving packet sequence numbers to the packets in distributing the packets in parallel to the plurality of packet forwarding units,
   the step of performing the process of forwarding the packets includes a process of holding the packets and their packet sequence numbers during the parallel process of forwarding the packets, and
   the step of rearranging the packets includes a process of rearranging the packets in an order of the packet sequence numbers.

5. The network routing method according to claim 4, wherein, in the step of performing the process of forwarding the packets, at least one of a number of packets forwarded, a number of bytes forwarded, a number of packets aborted and a number of bytes aborted is counted.

6. The network routing method according to claim 4, wherein, in the step of distributing the packets, the packets are distributed by executing at least one of a round-robin method and an out-of-order method.

7. The network routing method according to claim 1, wherein, in the step of distributing the packets, the packets are distributed by executing a hash method.

* * * * *